United States Patent
Yan et al.

(10) Patent No.: US 10,357,890 B2
(45) Date of Patent: Jul. 23, 2019

(54) DETACHABLE FLOATING SHAVER

(71) Applicant: Guangdong Roman Technology Co., Ltd., Dongguan (CN)

(72) Inventors: Youchun Yan, Dongguan (CN); Guang Lu, Dongguan (CN); Lili Yan, Dongguan (CN)

(73) Assignee: GUANGDONG ROMAN TECHNOLOGY CO., LTD., Dongguan, Guangdong Province (CN)

( * ) Notice: Subject to any disclaimer, the term of this patent is extended or adjusted under 35 U.S.C. 154(b) by 0 days.

(21) Appl. No.: 15/772,018

(22) PCT Filed: Jul. 21, 2017

(86) PCT No.: PCT/CN2017/093855
§ 371 (c)(1),
(2) Date: Apr. 27, 2018

(87) PCT Pub. No.: WO2018/149090
PCT Pub. Date: Aug. 23, 2018

(65) Prior Publication Data
US 2019/0061182 A1  Feb. 28, 2019

(30) Foreign Application Priority Data

Feb. 14, 2017 (CN) .......................... 2017 1 0079107

(51) Int. Cl.
*B26B 19/38* (2006.01)
*B26B 19/14* (2006.01)
(Continued)

(52) U.S. Cl.
CPC .......... *B26B 19/386* (2013.01); *B26B 19/146* (2013.01); *B26B 19/3866* (2013.01);
(Continued)

(58) Field of Classification Search
CPC . B26B 19/386; B26B 19/146; B26B 19/3866; B26B 19/3893; B29C 45/0001;
(Continued)

(56) References Cited

U.S. PATENT DOCUMENTS

| | | | | |
|---|---|---|---|---|
| 3,890,705 A | | 6/1975 | Tietjens | |
| 4,910,869 A | * | 3/1990 | Labrijn | ................... B26B 19/14 30/43.6 |
| 7,930,828 B2 | * | 4/2011 | Brada | ..................... B26B 19/14 30/43.4 |
| 8,393,082 B2 | * | 3/2013 | Shimizu | .................. B26B 19/14 30/43.5 |

(Continued)

FOREIGN PATENT DOCUMENTS

| | | |
|---|---|---|
| CN | 205735057 U | 11/2016 |
| CN | 106514732 A | 3/2017 |

(Continued)

*Primary Examiner* — Hwei-Siu C Payer
(74) *Attorney, Agent, or Firm* — Ming Chow; Sinorica, LLC

(57) ABSTRACT

A detachable floating shaver includes a head, a casing having a third through hole, a main housing, a first floating member, and a second floating member. Through the connection and positioning relationship between the two parent and child pivot portions, that is, the first floating member and the second floating member, the head can achieve a cross rotation relative to the main housing. The second floating member has a connecting member; through the detachable connection between the second floating member and the connecting member, the head of the shaver is detachably connected, which is convenient for replacement, cleaning and maintenance and is more practical. The shaver can achieve 360° rotation through two parent and child pivot portions and two elastic sleeves, and the effect of floating contact of the shaver with the user's face is good.

10 Claims, 5 Drawing Sheets

(51) Int. Cl.
  *C08L 83/04* (2006.01)
  *B29C 45/00* (2006.01)
  *B29K 83/00* (2006.01)
  *B29K 105/00* (2006.01)

(52) U.S. Cl.
  CPC ........... *C08L 83/04* (2013.01); *B26B 19/3893* (2013.01); *B29C 45/0001* (2013.01); *B29K 2083/00* (2013.01); *B29K 2105/0061* (2013.01); *C08L 2205/025* (2013.01); *C08L 2205/03* (2013.01); *C08L 2312/02* (2013.01)

(58) Field of Classification Search
  CPC ........ B29K 2083/00; B29K 2105/0061; C08L 2205/025; C08L 2205/03; C08L 2312/02; C08L 83/04
  See application file for complete search history.

(56) References Cited

U.S. PATENT DOCUMENTS

| | | | |
|---|---|---|---|
| 9,592,614 B2* | 3/2017 | Oosterhoff | B26B 19/146 |
| 9,919,437 B2* | 3/2018 | Veltman | B26B 19/388 |
| 2010/0287784 A1* | 11/2010 | Qiu | B26B 19/14 |
| | | | 30/527 |
| 2011/0173815 A1* | 7/2011 | Koike | B26B 19/14 |
| | | | 30/43.6 |
| 2015/0013167 A1* | 1/2015 | Shen | B26B 19/14 |
| | | | 30/43.6 |
| 2019/0061182 A1* | 2/2019 | Yan | C08L 83/04 |

FOREIGN PATENT DOCUMENTS

| | | |
|---|---|---|
| CN | 106671146 A | 5/2017 |
| CN | 206519977 U | 9/2017 |
| EP | 3 381 628 A1 * | 10/2018 |
| JP | 05317534 A | 12/1993 |
| WO | WO 2018/176698 A1 * | 10/2018 |

* cited by examiner

DETACHABLE FLOATING SHAVER

FIELD OF THE INVENTION

The present invention relates to a shaver, and more particularly to a detachable floating shaver.

BACKGROUND OF THE INVENTION

An electric shaver is one of the essential daily necessities for men. The electric shaver uses a motor to drive blades to rotate and shave the beards by rotating the blades at a high speed. The contact of the shaver with the human face is a key factor affecting the shaving effect and comfort. For the contour of the human face, a shaver with a floating head is developed. This shaver improves the contact of the head of the shaver with the human face. The floating portion of this conventional shaver is only the cutting head of the head. Through an elastic member, the head of the shaver can float at a certain angle according to the human face. The connection between the head and the handle of the shaver is fixed, and the floating angle of the cutting head is limited, so the user needs to manually adjust the angle of the handle and the human face to improve the contact. This cannot meet people's needs for high comfort use.

SUMMARY OF THE INVENTION

In order to overcome the disadvantages and deficiencies in the prior art, the object of the present invention is to provide a detachable floating shaver. The head of the shaver can realize 360° rotation relative to the main housing and improve the contact of the shaver blade with the user's face, thereby enhancing the performance of the shaver.

A detachable floating shaver comprises a head, a casing mounted on an outer layer of the head, a main housing for holding, a first floating member having a first through hole, and a second floating member disposed in the first through hole. The second floating member has a second through hole. The main housing is concavely provided with an accommodation trough for accommodating the first floating member. Left and right sides of the first floating member are provided with a pair of first parent pivot portions. The accommodation trough is provided with a pair of first child pivot portions in cooperation with the first parent pivot portions. A bottom of the first floating member is fixedly connected with a holding member. Two sides of the holding member are provided with holding lugs inserted into front and rear sides of the first through hole. The holding lugs are provided with second parent pivot portions. The second floating member is provided with a pair of second child pivot portions in cooperation with the second parent pivot portions.

The detachable floating shaver further includes a connecting member. The casing has a third through hole. An upper end of the connecting member is engaged with the third through hole. A lower end of the connecting member is detachably connected to the second floating member.

The left and right sides of the first floating member and the front and rear sides of the first through hole are merely used to identify the vertical relationship between the left and right directions and the front and rear directions. The front and rear sides and the left and right sides can be interchanged.

Wherein, an outer side of the lower end of the connecting member is provided with a positioning block. An inner wall of the second through hole of the second floating member is provided with a positioning groove in cooperation with the positioning block and a disengagement groove for the positioning block to disengage from the second floating member. A positioning bar is provided between the positioning groove and the disengagement groove for restricting the positioning block within the positioning groove.

Wherein, the head includes a first gear rotatably connected to the casing and a second gear meshing with the first gear. The second gear is connected with a cutting head. The first gear is provided with a protruding plate. The protruding plate is slidably connected with a connector. Preferably, the protruding plate is provided with a slide hole. The connector is provided with an engaging block inserted into the slide hole. The accommodation trough is provided with a transmission rod protruding from the accommodation groove. The transmission rod is provided with an engaging groove. The connector is provided with an engaging portion inserted into the engaging groove.

Wherein, the protruding plate includes a plurality of protruding plates. The protruding plates are arranged in an annular array around a rotating axle of the first gear.

Wherein, a first elastic member is mounted between the connector and the first gear.

Wherein, the main housing is provided with a protective cover and a motor. The transmission rod is rotatably connected to the protective cover. The transmission rod is equipped with a third gear located in the protective cover. An output shaft of the motor is provided with a fourth gear that is disposed in the protective cover and meshes with the third gear.

Wherein, a bottom surface of the accommodation trough is provided with a fixing plate abutting against the protective cover. The first child pivot portions are disposed on the fixing plate.

Wherein, the second gear is equipped with an insert plate. A lower end of the cutting head is connected with a rotary disc. The rotary disc is slidably connected to the insert plate. A second elastic member is mounted between the insert plate and the rotary disc.

Wherein, the head further includes a shaving disc. The shaving disc includes a floating cutting net and an eccentric surface surrounding the floating cutting net. The eccentric surface is provided with a plurality of anti-slip grooves.

Wherein, a resilient pad is disposed between the second floating member and the first floating member. A return spring is disposed under the first floating member. Preferably, the resilient pad is an elastic silicone rubber pad.

Wherein, the elastic silicone rubber pad consists of the following raw materials:

| Component A | |
|---|---|
| polysiloxane (I) | 55-60 parts |
| crosslinker | 1-10 parts |
| filler | 30-40 parts |
| coupling agent | 1-10 parts |
| polysiloxane (II) | 10-30 parts |
| Component B | |
| polysiloxane (III) | 60-70 parts |
| catalyst | 0.1-0.3 parts |
| inhibitors | 8-10 parts |
| acrylate compounds | 8-10 parts |

The linear polysiloxane (I) has the structural formula shown as:

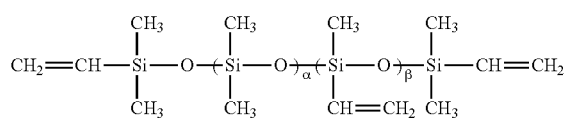

The number α and β of chains of the polysiloxane (I) are 3000-6000 and 200-300, respectively.

Both the polysiloxane (II) and polysiloxane (III) have the structural formula shown as:

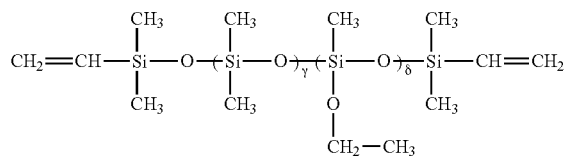

The number α and β of chains of the polysiloxane (II) are 5000-7000 and 200-400, respectively.

The number α and β of chains of the polysiloxane (III) are 6000-8000 and 100-300, respectively.

The crosslinker has the structural formula shown as:

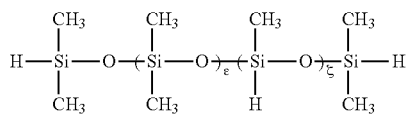

The number ε and ζ of chains of the hydrogen-containing polysiloxane are 200-300 and 50-80, respectively.

In this application, the vinyl of the side chains of the polysiloxane (I) can enhance the tensile strength and elasticity of the elastic silicone rubber pad, and the ethoxy of the side chains of the polysiloxane (II) and polysiloxane (III) can enhance the flexibility and elasticity of the elastic silicone rubber pad. The crosslinker provides a large amount of cross-linking groups-silicone and hydrogen groups, which can enhance the cross-link density of the elastic silicone rubber pad, thereby enhancing its waterproofness and elasticity, and is suitable for the polysiloxane containing a large amount of branched chains in this application.

The catalyst is composed of a mixture of karstedt catalyst and Lamoreaux catalyst in a ratio of 2-3:1 by weight; the acrylate compound is at least one of lauryl(meth)acrylate, diethylene glycol mono(meth)acrylate and γ-methacryloxypropyl trimethoxysilane; the inhibitor is at least one of ethynyl cycloethanol, 3,5-dimethyl-1-hexyne-3-ol and 2-propyne-1-ol; and the filler is silicone dioxide and/or titanium dioxide.

The catalyst of this application can accelerate the progress of the curing reaction. The acrylate compound can enhance the activity of the elastic silicone rubber pad and facilitate the fixed connection with the inorganic material. The inhibitor can reduce the side effects of the crosslinker and completely inhibit the generation of air bubbles during the curing reaction. The filler can make the elastic silicone rubber pad smooth.

The preparation method of the elastic silicone rubber pad consists of the steps of:

1. Preparation of Component A: polysiloxane (I) 50-60 parts, crosslinker 1-10 parts, filler 30-40 parts, coupling agent 1-10 parts, polysiloxane (II) 10-30 parts are added to the reaction flask, the temperature is raised to 70-80° C., and the raw materials are well mixed to obtain the Component A solution;

2. Preparation of Component B: polysiloxane (III) 60-70 parts, catalyst 0.1-0.3 parts, inhibitors 8-10 parts, acrylate compounds 8-10 parts are added to the reaction flask, the temperature is raised to 70-80° C., and the raw materials are well mixed to obtain the Component B solution;

3. Gel injection: the Component A solution and the Component B solution are well mixed to obtain a silicone rubber solution, the silicone rubber solution was injected into the mold, and heated to 80-100° C. and cured for 1-2 hours, and the waterproof silicone rubber is obtained.

The beneficial effects of the present invention are as follows: 1. Through the connection and positioning relationship between the two parent and child pivot portions, that is, the first floating member and the second floating member, the head can achieve a cross rotation relative to the main housing. The head can float and turn relative to the main housing in all directions. 2. Through the detachable connection between the second floating member and the connecting member, the head of the shaver is detachably connected, which is convenient for replacement, cleaning and maintenance and is more practical.

DETAILED DESCRIPTION OF THE PREFERRED EMBODIMENTS

For ease of understanding by those skilled in the art, embodiments of the present invention will now be described, by way of example only, with reference to the accompanying drawings. These embodiments are only for further description of the present invention, and are not intended to limit the scope of the present invention.

Figure 1:
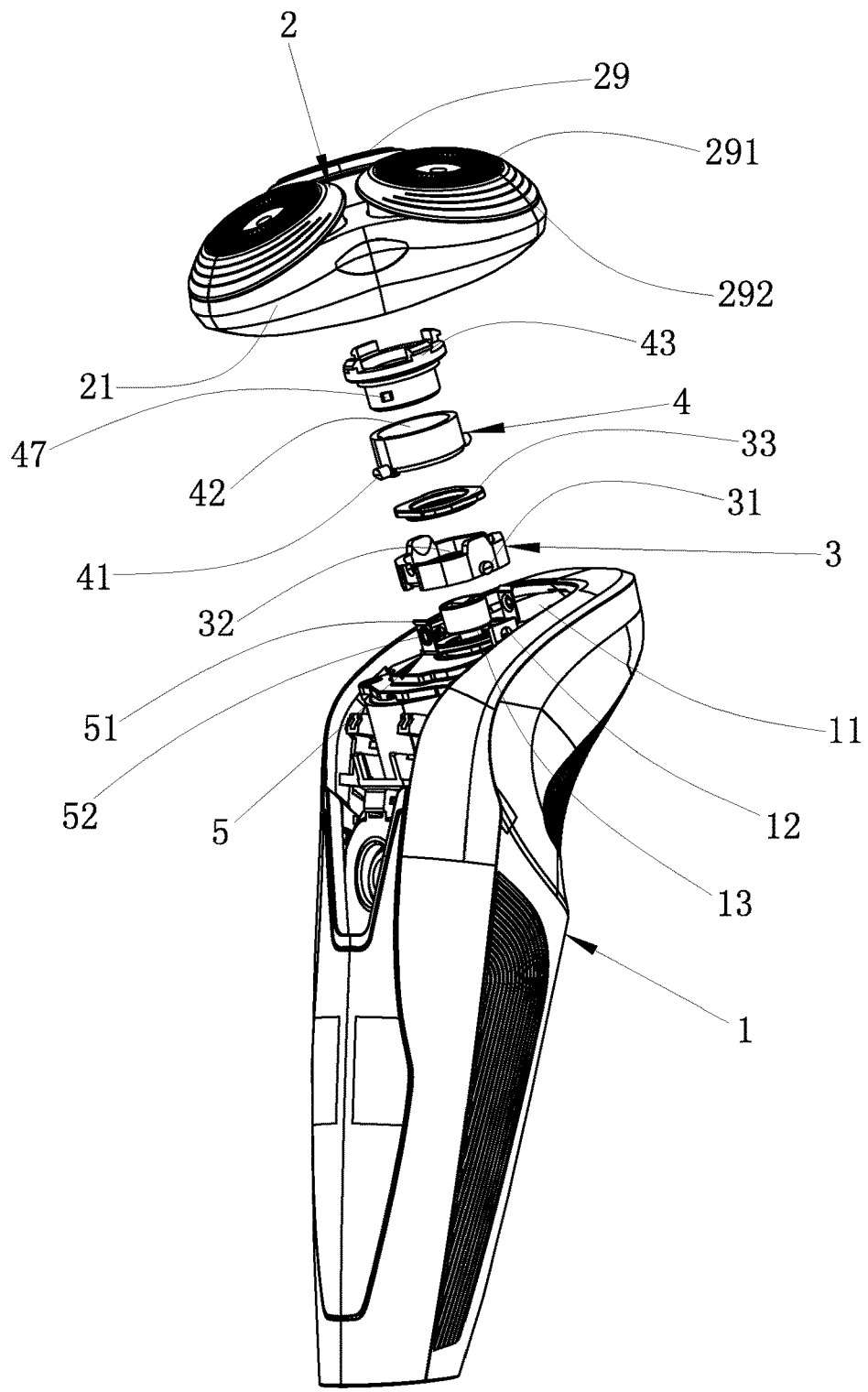
FIG. 1 is a first exploded view of the present invention.
Figure 2:
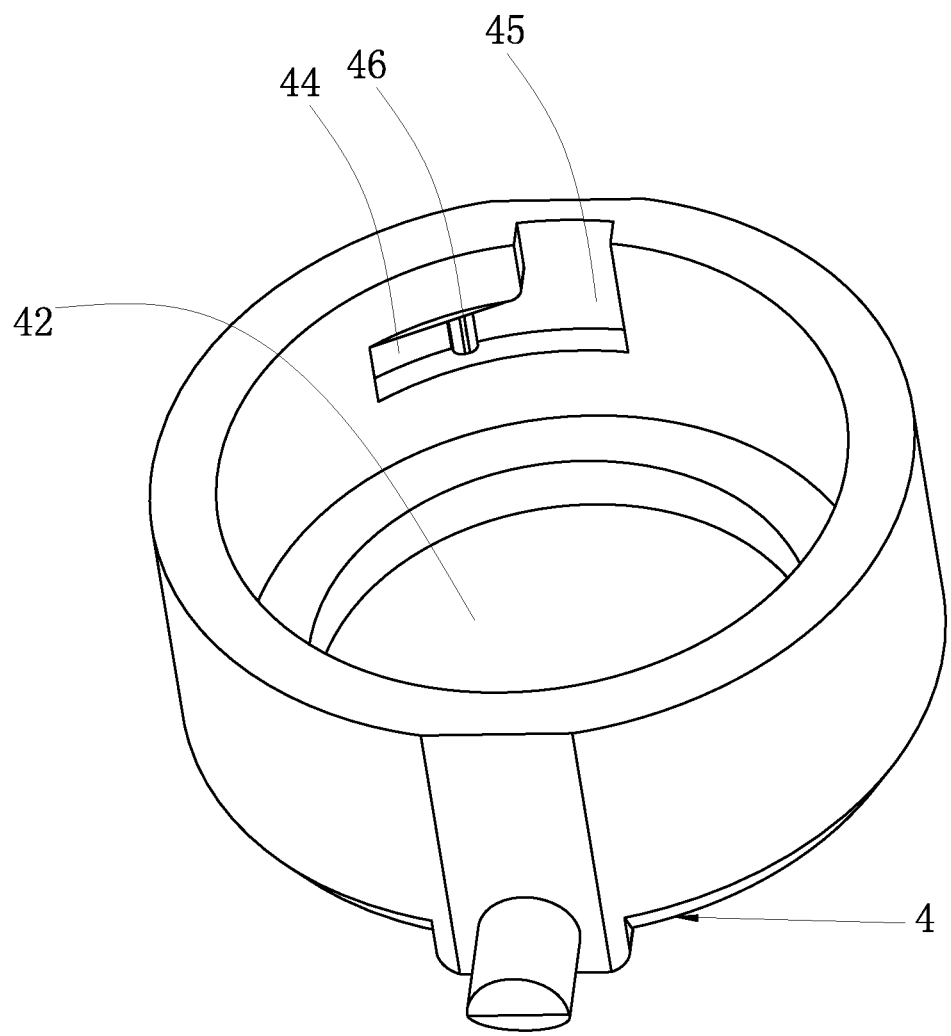
FIG. 2 is an enlarged view of the second floating member of the present invention.
Figure 3:
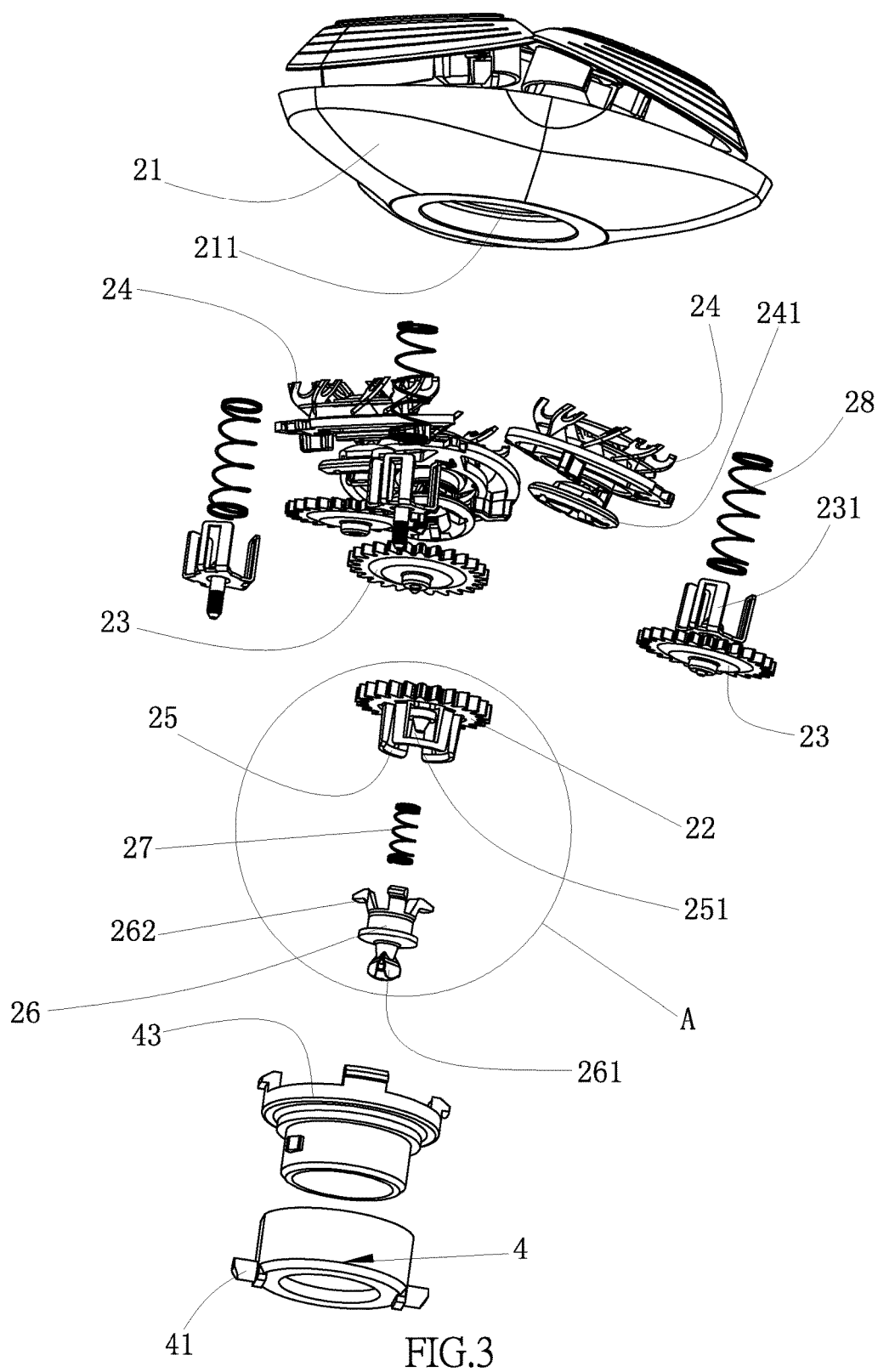
FIG. 3 is an exploded view of the head of the present invention.
Figure 4:
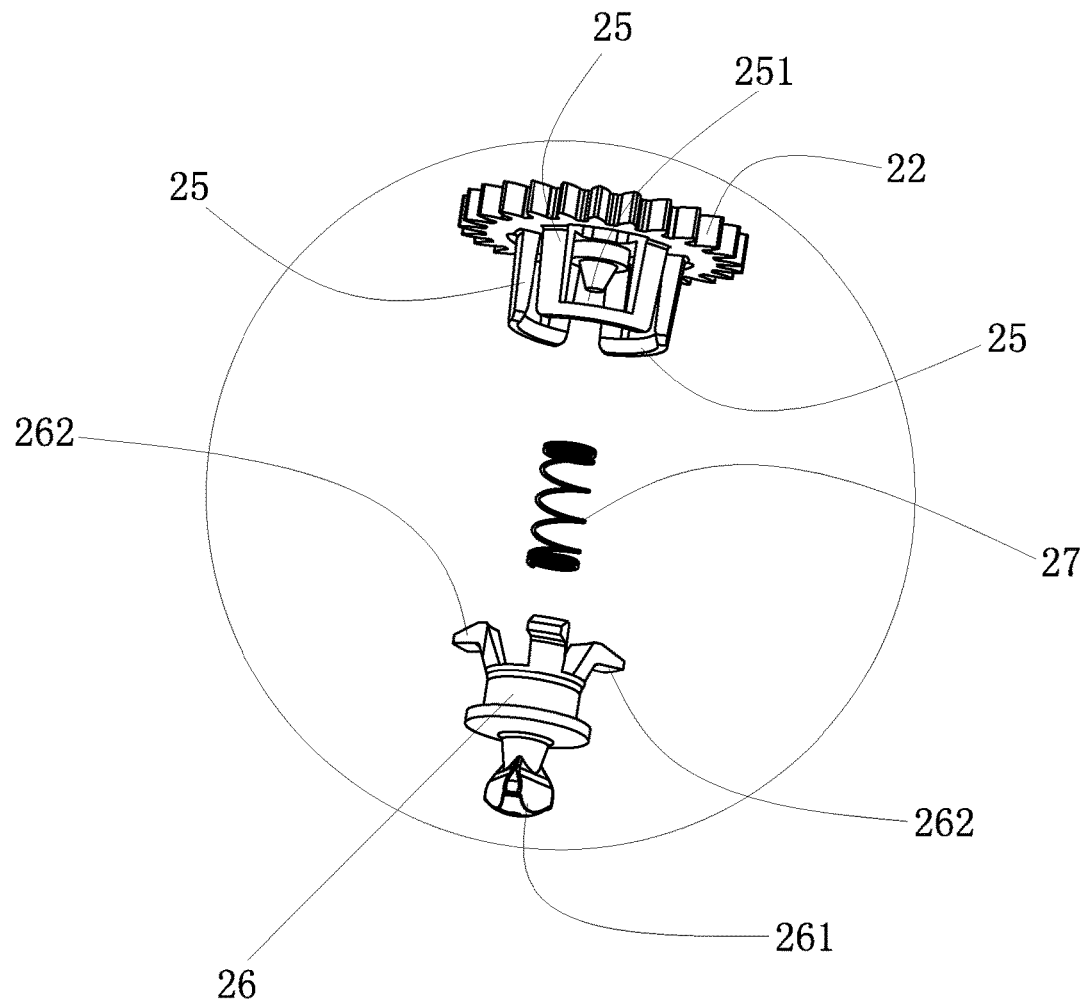
FIG. 4 is a partial enlarged view of circle A of FIG. 3.
Figure 5:
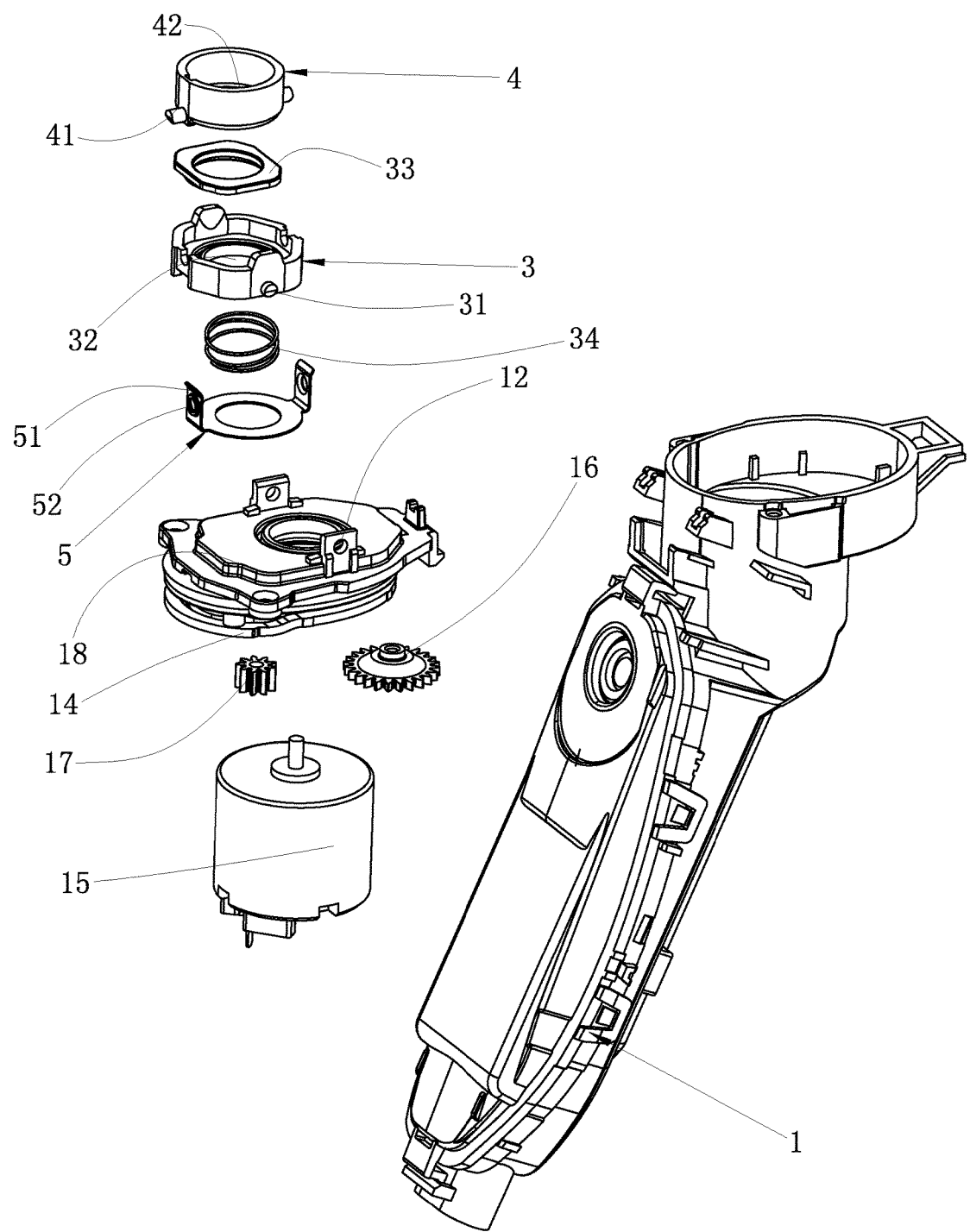
FIG. 5 is a second exploded view of the present invention.

Referring to FIG. 1 to FIG. 5, a detachable floating shaver of the present invention comprises a head 2, a casing 21 mounted on the outer layer of the head 2, a main housing 1 for holding, a first floating member 3 having a first through hole 32, and a second floating member 4 disposed in the first through hole 32. The second floating member 4 has a second through hole 42. The main housing 1 is concavely provided with an accommodation trough 11 for accommodating the first floating member 3. Left and right sides of the first floating member 3 are provided with a pair of first parent pivot portions 31. The accommodation trough 11 is provided with a pair of first child pivot portions 12 in cooperation with the first parent pivot portions 31. The bottom of the first floating member 3 is fixedly connected with a holding member 5. Two sides of the holding member 5 are provided with holding lugs 51 inserted into front and rear sides of the first through hole 32. The holding lugs 51 are provided with second parent pivot portions 52. The second floating member 4 is provided with a pair of second child pivot portions 41 in cooperation with the second parent pivot portions 52. The connection of the parent pivot portions and the child pivot portions realizes a cross rotation of the head 2 relative to the main housing 1, achieving a 360° floating turning effect.

The left and right sides of the first floating member 3 and the front and rear sides of the first through hole 32 are merely used to identify the vertical relationship between the left and right directions and the front and rear directions. The front and rear sides and the left and right sides can be interchanged.

The detachable floating shaver further includes a connecting member 43. The casing has a third through hole 211. An upper end of the connecting member 43 is engaged with the third through hole 211. A lower end of the connecting member 43 is detachably connected to the second floating member 4. Through the detachable connection between the second floating member and the connecting member, the head of the shaver can be detached, which is convenient for replacement, cleaning and maintenance and is more practical.

Preferably, the holding member 51 is made of metal. The holding member 51 and the first floating member 3 are independent components, so that the first and second parent pivot portions and the first and second child pivot portions can perform independent operation. Compared with the first and second parent pivot portions 52 directly provided on the first floating member 3, the processing requirements for the first floating member 3 can be reduced greatly in actual manufacturing. With the gap between the holding member 51 and the first floating member 3, the disassembly of the second floating member 4 is simplified.

Preferably, the first parent pivot portions 31 are pivot posts projecting from the first floating member 3. The first child pivot portions 12 are pivot holes. The first parent pivot portions 31 are inserted into the first child pivot portions 12 to form a pivot structure. The second child pivot portions 41 are pivot posts projecting from the second floating member 4. The second parent pivot portions 52 are pivot holes defined in the holding lugs 51. The second child pivot portions 41 are inserted into the second parent pivot portions 52 to form a pivot structure. The pivot structure formed by the pivot posts inserted into the pivot holes achieves a stable connection between the second floating member 4, the first floating member 3, and the main housing 1.

Wherein, the outer side of the lower end of the connecting member 43 is provided with a positioning block 47. The inner wall of the second through hole 42 of the second floating member 4 is provided with a positioning groove 44 in cooperation with the positioning block 47 and a disengagement groove 45 for the positioning block 47 to disengage from the second floating member 4. A positioning bar 46 is provided between the positioning groove 44 and the disengagement groove 45 for restricting the positioning block 47 within the positioning groove 44. In a normal use state, the positioning block 47 is stably engaged in the positioning groove 44 under the action of the positioning bar 46. When the head 2 needs to be disassembled, the positioning block 47 is pushed over the positioning bar 46 to enter the disengagement groove 45 by pushing the head 2. The disengagement groove 45 is provided with an outlet for the positioning block 47 to disengage from the disengagement groove 45. Preferably, the positioning bar 47 vertically separates the positioning groove 44 and the disengagement groove 45. When the head 2 needs to be disassembled, the head 2 is rotated horizontally so that the positioning block 47 passes over the positioning bar 46 to enter the disengagement groove 45. The upper end of the disengagement groove 45 is provided with an outlet for the positioning block 47 to disengage from the disengagement groove 45 upwardly. In this way, the head 2 can be rotated and then pulled upwardly to disengage from the second floating member 4.

Wherein, the head 2 further includes a first gear 22 rotatably connected to the casing 21 and a second gear 23 meshing with the first gear 22. The second gear 23 is connected with a cutting head 24. The first gear 22 is provided with a protruding plate 25. The protruding plate 25 is slidably connected with a connector 26. Preferably, the protruding plate 25 is provided with a slide hole 251. The connector 26 is provided with an engaging block 262 inserted into the slide hole 251.

The accommodation trough 11 is provided with a transmission rod 13 protruding from the accommodation groove 11. The transmission rod 13 is provided with an engaging groove 131. The connector 26 is provided with an engaging portion 261 inserted into the engaging groove 131.

Preferably, the engaging groove 131 has a non-circular shape, and the engaging portion 261 has a non-circular shape corresponding to the engaging groove 131.

Firstly, the engagement of the engaging portion 261 and the engaging groove 131 can prevent "slippage" between the connector 26 and the transmission rod 13. Through the slide connection relationship between the slide hole 251 and the engaging block 262, the rotating axle of the first gear 22 can be rotated along with the rotation of the cutting head 24, and the turning of the rotation can be smoothly realized. Finally, the meshing relationship between the first gear 22 and the second gear 23 enables the turning rotation to extend to a plurality of cutting heads 24. The synchronous turning of the head 2 and the cutting head 24 is realized, so as to achieve a full float.

Wherein, a plurality of protruding plates 25 are provided and arranged in an annular array around the rotating axle of the first gear 22. Preferably, the number of the protruding plates 25 is three. The three protruding plates 25 can achieve a stable connection between the gear and the connector and provide greater turning freedom.

Wherein, a first elastic member 27 is mounted between the connector 26 and the first gear 22. The first elastic member 27 makes the engaging block 262 always be in a "floating" state at the height of the slide hole 251, greatly reducing the frictional force of the turning of the first gear 22. The driving force of turning the first gear 22 cooperates with a first elastic sleeve 33 to perform a return action.

Wherein, the main housing 1 is provided with a protective cover 14 and a motor 15. The transmission rod 13 is rotatably connected to the protective cover 14. The transmission rod 13 is equipped with a third gear 16 located in the protective cover 14. An output shaft of the motor 15 is provided with a fourth gear 17 that is disposed in the protective cover 14 and meshes with the third gear 16. The engagement of the fourth gear 17 with the third gear 16 achieves deceleration of the motor 12 and increases the output torque. The protective cover 14 protects the third gear 16 and the fourth gear 17 from colliding with the third gear 16 and the fourth gear 17 and prevents foreign matters from entering the third gear 16 and the fourth gear 17 to affect the meshing transmission therebetween. In the actual assembly, the protective cover 14, the third gear 16 and the transmission rod 13 form a separate unit to improve the assembly efficiency of the entire shaver.

Wherein, the bottom surface of the accommodation trough 11 is provided with a fixing plate 18 abutting against the protective cover 14. The first child pivot portions 12 are disposed on the fixing plate 18. Compared with the fixing plate 18 only fixed on the main housing 1, the mounting strength of the fixing plate 18 is greatly enhanced. The first floating member 3 is rotatably connected to the fixing plate 18. In this embodiment, the fixing plate 18 is provided with two spaced pivot shafts. The left and right sides of the first floating member 3 are provided with two clamping plates. The clamping plates are provided with pivot holes in cooperation with the pivot shafts. After the first floating member 3 is installed on the fixing plate 18, the pivot shafts are inserted in the pivot holes.

The second gear 23 is equipped with an insert plate 231. The cutting head 24 is connected with a rotary disc 241. The rotary disc 241 is slidably connected to the insert plate 231. A second elastic member 28 is installed between the insert plate 231 and the rotary disc 241. Through such an arrangement, the pressure of the beards to the cutting head 24 can make the cutting head 24 turn relative to the second gear 23. This can prevent the shaver from being jammed because of long beards entering a floatable cutting net 291. The user's comfort experience is greatly enhanced.

The head 2 is provided with a shaving disc 29. The shaving disc 29 includes a floating cutting net 291 and an eccentric surface 292 surrounding the floating cutting net 291. The eccentric surface 292 is provided with a plurality of anti-slip grooves. The floating cutting net 291 can be independently turned 360° and float in a small area in cooperation with the turning effect of the two floating members to attach to the user's face at a smaller turning angle. The non-slip grooves can prevent the beards from adhering to each other due to the facial oil. The beards can be dispersed after being blocked by the anti-slip grooves, thereby facilitating the beards to enter the floatable cutting net 291 better.

A resilient pad 33 is disposed between the second floating member 4 and the first floating member 3. A return spring 34 is disposed under the first floating member 3. The elastic pad 33 can realize a deformation buffering function to reduce the rigid contact between the second floating member 4 and the first floating member 3, and can provide the second floating member 4 with a return function to some extent. The return spring 34 can provide the first floating member 3 with a return function. The elastic effect makes the shaver attach to the user's face more comfortably, and the shaving effect is better. Preferably, the elastic pad 33 is an elastic silicone rubber pad and can achieve acoustic insulation and noise reduction.

Embodiment 2

The difference between this embodiment and the first embodiment is that the elastic pad 33 is an elastic silicone rubber pad.

Wherein, the elastic silicone rubber pad consists of the following raw materials:

| Component A | |
| --- | --- |
| polysiloxane (I) | 55 parts |
| crosslinker | 5.5 parts |
| filler | 35 parts |
| coupling agent | 5.5 parts |
| polysiloxane (II) | 20 parts |
| Component B | |
| polysiloxane (III) | 65 parts |
| catalyst | 0.2 parts |
| inhibitors | 9 parts |
| acrylate compounds | 9 parts |

The linear polysiloxane (I) has the structural formula shown as:

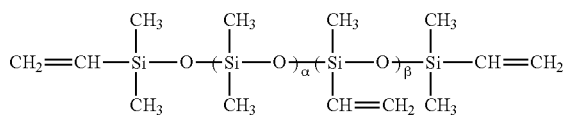

The number α and β of chains of the polysiloxane (I) are 4500 and 250, respectively.

Both the polysiloxane (II) and polysiloxane (III) have the structural formula shown as:

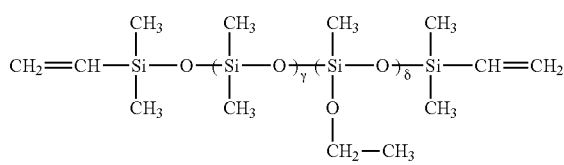

The number α and β of chains of the polysiloxane (II) are 6000 and 300, respectively. The number α and β of chains of the polysiloxane (III) are 7000 and 200, respectively. The crosslinker has the structural formula shown as:

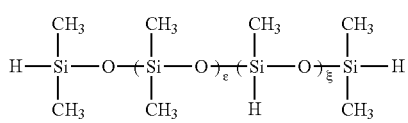

The number ε and ζ of chains of the hydrogen-containing polysiloxane are 250 and 60, respectively.

Wherein, the catalyst is composed of a mixture of karstedt catalyst and Lamoreaux catalyst in a ratio of 2.5:1 by weight; the acrylate compound is composed of a mixture of lauryl(meth)acrylate, diethylene glycol mono(meth)acrylate, and γ-methacryloxypropyl trimethoxysilane in a ratio of 1:1:1 by weight; the inhibitor is composed of a mixture of ethynyl cycloethanol, 3,5-dimethyl-1-hexyne-3-ol and 2-propyne-1-ol in a ratio of 2:1:1 by weight; and the filler is titanium dioxide.

The preparation method of the elastic silicone rubber pad consists of the steps of:

1. Preparation of Component A: the raw materials with the specific ratio of, the above-mentioned Component A, is added to the reaction flask, the temperature is raised to 75° C., and the raw materials are well mixed to obtain the Component A solution;

2. Preparation of Component B: the raw materials with the specific ratio of, the above-mentioned Component B, is added to the reaction flask, the temperature is raised to 75° C., and the raw materials are well mixed to obtain the Component B solution;

3. Gel injection: the Component A solution and the Component B solution are well mixed to obtain a silicone rubber solution, the silicone rubber solution is injected into a mold, and heated to 90° C. and cured for 1.5 hours, and the waterproof silicone rubber is obtained.

Embodiment 3

The difference between this embodiment and the first embodiment is that the elastic pad 33 is an elastic silicone rubber pad.

Wherein, the elastic silicone rubber pad consists of the following raw materials:

| Component A | |
| --- | --- |
| polysiloxane (I) | 60 parts |
| crosslinker | 10 parts |
| filler | 40 parts |
| coupling agent | 10 parts |
| polysiloxane (II) | 30 parts |
| Component B | |
| polysiloxane (III) | 70 parts |
| catalyst | 0.3 parts |
| inhibitors | 8 parts |
| acrylate compounds | 8 parts |

The linear polysiloxane (I) has the structural formula shown as:

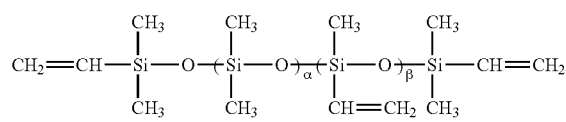

The number $\alpha$ and $\beta$ of chains of the polysiloxane (I) are 3000 and 200, respectively.

Both the polysiloxane (II) and polysiloxane (III) have the structural formula shown as:

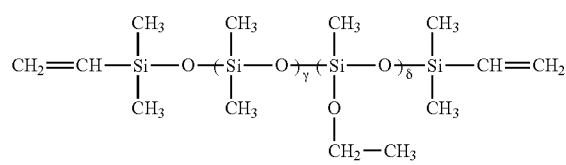

The number $\alpha$ and $\beta$ of chains of the polysiloxane (II) are 5000 and 200, respectively.

The number $\alpha$ and $\beta$ of chains of the polysiloxane (III) are 6000 and 100, respectively.

The crosslinker has the structural formula shown as:

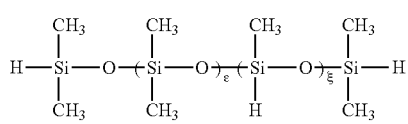

The number $\varepsilon$ and $\zeta$ of chains of the hydrogen-containing polysiloxane are 200 and 50, respectively.

Wherein, the catalyst is composed of a mixture of karstedt catalyst and Lamoreaux catalyst in a ratio of 2:1 by weight; the acrylate compound is lauryl(meth)acrylate; the inhibitor is ethynyl cycloethanol; and the filler is silicone dioxide.

The preparation method of the elastic silicone rubber pad consists of the steps of:

1. Preparation of Component A: the raw materials with the specific ratio of, the above-mentioned Component A, is added to the reaction flask, the temperature is raised to 70° C., and the raw materials are well mixed to obtain the Component A solution;

2. Preparation of Component B: the raw materials with the specific ratio of, the above-mentioned Component B, is added to the reaction flask, the temperature is raised to 70° C., and the raw materials are well mixed to obtain the Component B solution;

3. Gel injection: the Component A solution and the Component B solution are well mixed to obtain a silicone rubber solution, the silicone rubber solution is injected into a mold, and heated to 80° C. and cured for 1 hours, and the waterproof silicone rubber is obtained.

Embodiment 4

The difference between this embodiment and the first embodiment is that the elastic pad 33 is an elastic silicone rubber pad.

Wherein, the elastic silicone rubber pad consists of the following raw materials:

| Component A | |
| --- | --- |
| polysiloxane (I) | 50 parts |
| crosslinker | 1 part |
| filler | 30 parts |
| coupling agent | 1 part |
| polysiloxane (II) | 10 parts |
| Component B | |
| polysiloxane (III) | 60 parts |
| catalyst | 0.1 parts |
| inhibitors | 10 parts |
| acrylate compounds | 10 parts |

The linear polysiloxane (I) has the structural formula shown as:

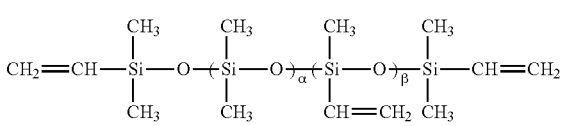

The number $\alpha$ and $\beta$ of chains of the polysiloxane (I) are 6000 and 300, respectively.

Both the polysiloxane (II) and polysiloxane (III) have the structural formula shown as:

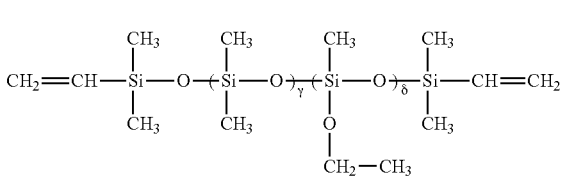

The number $\alpha$ and $\beta$ of chains of the polysiloxane (II) are 7000 and 400, respectively.

The number $\alpha$ and $\beta$ of chains of the polysiloxane (III) are 8000 and 300, respectively.

The crosslinker has the structural formula shown as:

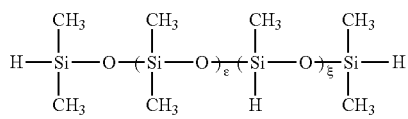

The number ε and ζ of chains of the hydrogen-containing polysiloxane are 300 and 80, respectively.

Wherein, the catalyst is composed of a mixture of karstedt catalyst and Lamoreaux catalyst in a ratio of 3:1 by weight; the acrylate compound is γ-methacryloxypropyl trimethoxysilane; the inhibitor is composed of a mixture of ethynyl cycloethanol, and 3,5-dimethyl-1-hexyne-3-ol in a ratio of 1:1 by weight; and the filler is silicone dioxide and titanium dioxide.

The preparation method of the elastic silicone rubber pad consists of the steps of:

1. Preparation of Component A: the raw materials with the specific ratio of, the above-mentioned Component A, is added to the reaction flask, the temperature is raised to 77° C., and the raw materials are well mixed to obtain the Component A solution;

2. Preparation of Component B: the raw materials with the specific ratio of, the above-mentioned Component B, is added to the reaction flask, the temperature is raised to 78° C., and the raw materials are well mixed to obtain the Component B solution;

3. Gel injection: the Component A solution and the Component B solution are well mixed to obtain a silicone rubber solution, the silicone rubber solution is injected into a mold, and heated to 85° C. and cured for 1.2 hours, and the waterproof silicone rubber is obtained.

Embodiment 5

The difference between this embodiment and the first embodiment is that the elastic pad 33 is an elastic silicone rubber pad.

Wherein, the elastic silicone rubber pad consists of the following raw materials:

| Component A | |
|---|---|
| polysiloxane (I) | 56 parts |
| crosslinker | 7 parts |
| filler | 32 parts |
| coupling agent | 7 parts |
| polysiloxane (II) | 26 parts |
| Component B | |
| polysiloxane (III) | 64 parts |
| catalyst | 0.1 parts |
| inhibitors | 8.5 parts |
| acrylate compounds | 9.5 parts |

The linear polysiloxane (I) has the structural formula shown as:

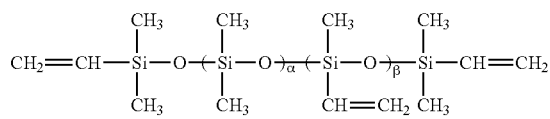

The number α and β of chains of the polysiloxane (I) are 4000 and 250, respectively.

Both the polysiloxane (II) and polysiloxane (III) have the structural formula shown as:

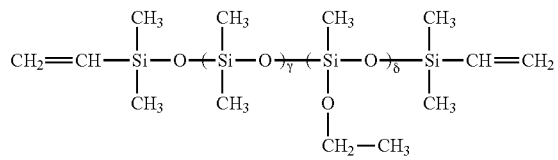

The number α and β of chains of the polysiloxane (II) are 6000 and 200, respectively.

The number α and β of chains of the polysiloxane (III) are 7500 and 100, respectively.

The crosslinker has the structural formula shown as:

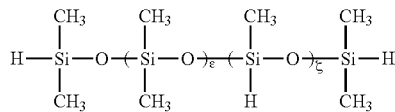

The number ε and ζ of chains of the hydrogen-containing polysiloxane are 260 and 70, respectively.

Wherein, the catalyst is composed of a mixture of karstedt catalyst and Lamoreaux catalyst in a ratio of 2.2:1 by weight; the acrylate compound is composed of a mixture of lauryl (meth)acrylate, diethylene glycol mono(meth)acrylate, and γ-methacryloxypropyl trimethoxysilane in a ratio of 1:2:1 by weight; the inhibitor is composed of a mixture of ethynyl cycloethanol and 2-propyne-1-ol in a ratio of 1:1 by weight; and the filler is silicone dioxide.

The preparation method of the elastic silicone rubber pad consists of the steps of:

1. Preparation of Component A: the raw materials with the specific ratio of, the above-mentioned Component A, is added to the reaction flask, the temperature is raised to 74° C., and the raw materials are well mixed to obtain the Component A solution;

2. Preparation of Component B: the raw materials with the specific ratio of, the above-mentioned Component B, is added to the reaction flask, the temperature is raised to 76° C., and the raw materials are well mixed to obtain the Component B solution;

3. Gel injection: the Component A solution and the Component B solution are well mixed to obtain a silicone rubber solution, the silicone rubber solution is injected into a mold, and heated to 88° C. and cured for 1.6 hours, and the waterproof silicone rubber is obtained.

Embodiment 6

The difference between this embodiment and the first embodiment is that the elastic pad 33 is an elastic silicone rubber pad.

Wherein, the elastic silicone rubber pad consists of the following raw materials:

| Component A | |
|---|---|
| polysiloxane (I) | 57 parts |
| crosslinker | 6 parts |

-continued

| | |
|---|---|
| filler | 34 parts |
| coupling agent | 5 parts |
| polysiloxane (II) | 23 parts |
| Component B | |
| polysiloxane (III) | 66 parts |
| catalyst | 0.15 parts |
| inhibitors | 8.5 parts |
| acrylate compounds | 8.8 parts |

The linear polysiloxane (I) has the structural formula shown as:

$$CH_2=CH-\underset{\underset{CH_3}{|}}{\overset{\overset{CH_3}{|}}{Si}}-O-(\underset{\underset{CH_3}{|}}{\overset{\overset{CH_3}{|}}{Si}}-O)_\alpha-(\underset{\underset{CH=CH_2}{|}}{\overset{\overset{CH_3}{|}}{Si}}-O)_\beta-\underset{\underset{CH_3}{|}}{\overset{\overset{CH_3}{|}}{Si}}-CH=CH_2$$

The number α and β of chains of the polysiloxane (I) are 5000 and 230, respectively.

Both the polysiloxane (II) and polysiloxane (III) have the structural formula shown as:

$$CH_2=CH-\underset{\underset{CH_3}{|}}{\overset{\overset{CH_3}{|}}{Si}}-O-(\underset{\underset{CH_3}{|}}{\overset{\overset{CH_3}{|}}{Si}}-O)_\gamma-(\underset{\underset{O}{|}}{\overset{\overset{CH_3}{|}}{Si}}-O)_\delta-\underset{\underset{CH_3}{|}}{\overset{\overset{CH_3}{|}}{Si}}-CH=CH_2$$
$$\underset{CH_2-CH_3}{}$$

The number α and β of chains of the polysiloxane (II) are 6800 and 250, respectively.

The number α and β of chains of the polysiloxane (III) are 7500 and 150, respectively.

The crosslinker has the structural formula shown as:

$$H-\underset{\underset{CH_3}{|}}{\overset{\overset{CH_3}{|}}{Si}}-O-(\underset{\underset{CH_3}{|}}{\overset{\overset{CH_3}{|}}{Si}}-O)_\varepsilon-(\underset{\underset{H}{|}}{\overset{\overset{CH_3}{|}}{Si}}-O)_\zeta-\underset{\underset{CH_3}{|}}{\overset{\overset{CH_3}{|}}{Si}}-H$$

The number ε and ζ of chains of the hydrogen-containing polysiloxane are 280 and 70, respectively.

Wherein, the catalyst is composed of a mixture of karstedt catalyst and Lamoreaux catalyst in a ratio of 2.7:1 by weight; the acrylate compound is diethylene glycol mono (meth)acrylate; the inhibitor is composed of a mixture of ethynyl cycloethanol and 2-propyne-1-ol in a ratio of 1:1 by weight; and the filler is titanium dioxide.

The preparation method of the elastic silicone rubber pad consists of the steps of:

1. Preparation of Component A: the raw materials with the specific ratio of, the above-mentioned Component A, is added to the reaction flask, the temperature is raised to 76° C., and the raw materials are well mixed to obtain the Component A solution;

2. Preparation of Component B: the raw materials with the specific ratio of, the above-mentioned Component B, is added to the reaction flask, the temperature is raised to 72° C., and the raw materials are well mixed to obtain the Component B solution;

3. Gel injection: the Component A solution and the Component B solution are well mixed to obtain a silicone rubber solution, the silicone rubber solution is injected into a mold, and heated to 99° C. and cured for 1.4 hours, and the waterproof silicone rubber is obtained.

Embodiment 7

The difference between this embodiment and the first embodiment is that the elastic pad 33 is an elastic silicone rubber pad.

Wherein, the elastic silicone rubber pad consists of the following raw materials:

| | |
|---|---|
| Component A | |
| polysiloxane (I) | 57 parts |
| crosslinker | 8 parts |
| filler | 35 parts |
| coupling agent | 6.5 parts |
| polysiloxane (II) | 19 parts |
| Component B | |
| polysiloxane (III) | 66 parts |
| catalyst | 0.28 parts |
| inhibitors | 8.4 parts |
| acrylate compounds | 9.5 parts |

The linear polysiloxane (I) has the structural formula shown as:

$$CH_2=CH-\underset{\underset{CH_3}{|}}{\overset{\overset{CH_3}{|}}{Si}}-O-(\underset{\underset{CH_3}{|}}{\overset{\overset{CH_3}{|}}{Si}}-O)_\alpha-(\underset{\underset{CH=CH_2}{|}}{\overset{\overset{CH_3}{|}}{Si}}-O)_\beta-\underset{\underset{CH_3}{|}}{\overset{\overset{CH_3}{|}}{Si}}-CH=CH_2$$

The number α and β of chains of the polysiloxane (I) are 4500 and 250, respectively.

Both the polysiloxane (II) and polysiloxane (III) have the structural formula shown as:

$$CH_2=CH-\underset{\underset{CH_3}{|}}{\overset{\overset{CH_3}{|}}{Si}}-O-(\underset{\underset{CH_3}{|}}{\overset{\overset{CH_3}{|}}{Si}}-O)_\gamma-(\underset{\underset{O}{|}}{\overset{\overset{CH_3}{|}}{Si}}-O)_\delta-\underset{\underset{CH_3}{|}}{\overset{\overset{CH_3}{|}}{Si}}-CH=CH_2$$
$$\underset{CH_2-CH_3}{}$$

The number α and β of chains of the polysiloxane (II) are 6000 and 300, respectively.

The number α and β of chains of the polysiloxane (III) are 6000 and 200, respectively.

The crosslinker has the structural formula shown as:

$$H-\underset{\underset{CH_3}{|}}{\overset{\overset{CH_3}{|}}{Si}}-O-(\underset{\underset{CH_3}{|}}{\overset{\overset{CH_3}{|}}{Si}}-O)_\varepsilon-(\underset{\underset{H}{|}}{\overset{\overset{CH_3}{|}}{Si}}-O)_\zeta-\underset{\underset{CH_3}{|}}{\overset{\overset{CH_3}{|}}{Si}}-H$$

The number ε and ζ of chains of the hydrogen-containing polysiloxane are 300 and 50, respectively.

Wherein, the catalyst is composed of a mixture of karstedt catalyst and Lamoreaux catalyst in a ratio of 2.4:1 by weight; the acrylate compound is composed of a mixture of lauryl(meth)acrylate and diethylene glycol mono(meth) acrylate in a ratio of 2:1 by weight; the inhibitor is composed of a mixture of ethynyl cycloethanol, 3,5-dimethyl-1-hexyne-3-ol and 2-propyne-1-ol in a ratio of 2:1:3 by weight; and the filler is silicone dioxide and/or titanium dioxide.

The preparation method of the elastic silicone rubber pad consists of the steps of:

1. Preparation of Component A: the raw materials with the specific ratio of, the above-mentioned Component A, is added to the reaction flask, the temperature is raised to 75° C., and the raw materials are well mixed to obtain the Component A solution;

2. Preparation of Component B: the raw materials with the specific ratio of, the above-mentioned Component B, is added to the reaction flask, the temperature is raised to 78° C., and the raw materials are well mixed to obtain the Component B solution;

3. Gel injection: the Component A solution and the Component B solution are well mixed to obtain a silicone rubber solution, the silicone rubber solution is injected into a mold, and heated to 100° C. and cured for 1.7 hours, and the waterproof silicone rubber is obtained.

Embodiment 8

The difference between this embodiment and the first embodiment is that the elastic pad 33 is an elastic silicone rubber pad.

Wherein, the elastic silicone rubber pad consists of the following raw materials:

| Component A | |
|---|---|
| polysiloxane (I) | 57 parts |
| crosslinker | 8 parts |
| filler | 33 parts |
| coupling agent | 2 parts |
| polysiloxane (II) | 11 parts |
| Component B | |
| polysiloxane (III) | 67 parts |
| catalyst | 0.26 parts |
| inhibitors | 10 parts |
| acrylate compounds | 9 parts |

The linear polysiloxane (I) has the structural formula shown as:

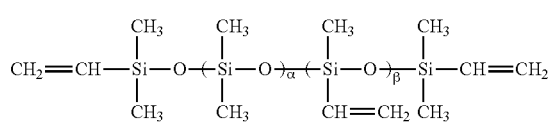

The number α and β of chains of the polysiloxane (I) are 5000 and 260, respectively.

Both the polysiloxane (II) and polysiloxane (III) have the structural formula shown as:

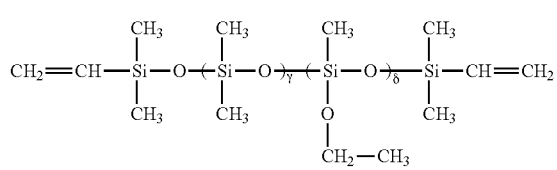

The number α and β of chains of the polysiloxane (II) are 6000 and 320, respectively.

The number α and β of chains of the polysiloxane (III) are 7000 and 180, respectively.

The crosslinker has the structural formula shown as:

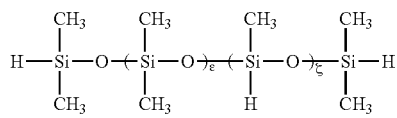

The number ε and ζ of chains of the hydrogen-containing polysiloxane are 200 and 80, respectively.

Wherein, the catalyst is composed of a mixture of karstedt catalyst and Lamoreaux catalyst in a ratio of 2.2:1 by weight; the acrylate compound is diethylene glycol mono (meth)acrylate; the inhibitor is composed of a mixture of ethynyl cycloethanol, 3,5-dimethyl-1-hexyne-3-ol and 2-propyne-1-ol in a ratio of 1:5:2 by weight; and the filler is composed of a mixture of silicone dioxide and titanium dioxide in a ratio of 1:1.

The preparation method of the elastic silicone rubber pad consists of the steps of:

1. Preparation of Component A: the raw materials with the specific ratio of, the above-mentioned Component A, is added to the reaction flask, the temperature is raised to 77° C., and the raw materials are well mixed to obtain the Component A solution;

2. Preparation of Component B: the raw materials with the specific ratio of, the above-mentioned Component B, is added to the reaction flask, the temperature is raised to 74° C., and the raw materials are well mixed to obtain the Component B solution;

3. Gel injection: the Component A solution and the Component B solution are well mixed to obtain a silicone rubber solution, the silicone rubber solution is injected into a mold, and heated to 96° C. and cured for 1.3 hours, and the waterproof silicone rubber is obtained.

Embodiment 9

The difference between this embodiment and the first embodiment is that the elastic pad 33 is an elastic silicone rubber pad.

Wherein, the elastic silicone rubber pad consists of the following raw materials:

| Component A | |
|---|---|
| polysiloxane (I) | 55 parts |
| crosslinker | 9 parts |
| filler | 33 parts |
| coupling agent | 5 parts |
| polysiloxane (II) | 17 parts |
| Component B | |
| polysiloxane (III) | 64 parts |
| catalyst | 0.23 parts |
| inhibitors | 9 parts |
| acrylate compounds | 9.6 parts |

The linear polysiloxane (I) has the structural formula shown as:

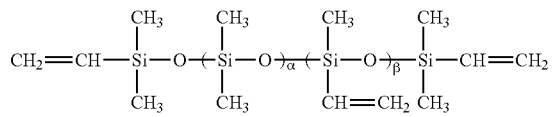 [SMILES: C=C[Si](C)(C)O[Si](C)(C)O[Si](C)(C=C)O[Si](C)(C)C=C]

The number α and β of chains of the polysiloxane (I) are 4500 and 270, respectively.

Both the polysiloxane (II) and polysiloxane (III) have the structural formula shown as:

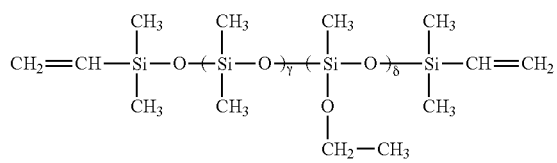 [SMILES: C=C[Si](C)(C)O[Si](C)(C)O[Si](C)(OCC)O[Si](C)(C)C=C]

The number α and β of chains of the polysiloxane (II) are 6400 and 360, respectively.

The number α and β of chains of the polysiloxane (III) are 7500 and 260, respectively.

The crosslinker has the structural formula shown as:

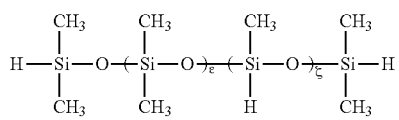

The number ε and ζ of chains of the hydrogen-containing polysiloxane are 240 and 60, respectively.

Wherein, the catalyst is composed of a mixture of karstedt catalyst and Lamoreaux catalyst in a ratio of 2.8:1 by weight; the acrylate compound is lauryl(meth)acrylate; the inhibitor is ethynyl cycloethanol; and the filler is composed of a mixture of silicone dioxide and titanium dioxide in a ratio of 3:1 by weight.

The preparation method of the elastic silicone rubber pad consists of the steps of:

1. Preparation of Component A: the raw materials with the specific ratio of, the above-mentioned Component A, is added to the reaction flask, the temperature is raised to 73° C., and the raw materials are well mixed to obtain the Component A solution;

2. Preparation of Component B: the raw materials with the specific ratio of, the above-mentioned Component B, is added to the reaction flask, the temperature is raised to 77° C., and the raw materials are well mixed to obtain the Component B solution;

3. Gel injection: the Component A solution and the Component B solution are well mixed to obtain a silicone rubber solution, the silicone rubber solution is injected into a mold, and heated to 88° C. and cured for 1.3 hours, and the waterproof silicone rubber is obtained.

The above table shows the performance test table for the elastic rubber pad. The elastic silicone rubber pad of this application has good mechanical properties, particularly bending strength, tensile strength and rebound rate, are greatly improved than conventional silicone rubber. In the present invention, the floating effect of the shaver of the present invention can be greatly enhanced in conjunction with the floating member. Also, through the inspection of actual products, the silicone rubber of this application still has more than 65% of the rebound rate after being repeatedly stretched 20,000 times, more than 50% of the rebound rate after being repeatedly stretched 50,000 times. The service life of the product is greatly prolonged. The silicone rubber sleeve can be replaced, which is convenient and practical. Through actual inspection, shavers with elastic rubber pads improve anti-vibration and noise-reduction greatly and provide better use experiences.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A detachable floating shaver, comprising a head, a casing mounted on an outer layer of the head, a main housing for holding, a first floating member having a first through hole, and a second floating member disposed in the first through hole, the second floating member having a second through hole, the main housing being concavely provided with an accommodation trough for accommodating the first floating member, left and right sides of the first floating member being provided with a pair of first parent pivot portions, the accommodation trough being provided with a pair of first child pivot portions in cooperation with the first parent pivot portions, a bottom of the first floating member being fixedly connected with a holding member, two sides of the holding member being provided with holding lugs inserted into front and rear sides of the first through hole, the holding lugs being provided with second parent pivot portions, the second floating member being provided with a pair of second child pivot portions in cooperation with the second parent pivot portions;

the detachable floating shaver further including a connecting member, the casing having a third through hole, an upper end of the connecting member being engaged with the third through hole, a lower end of the connecting member being detachably connected to the second floating member.

2. The detachable floating shaver as claimed in claim 1, wherein an outer side of the lower end of the connecting member is provided with a positioning block, an inner wall of the second through hole of the second floating member is provided with a positioning groove in cooperation with the positioning block and a disengagement groove for the positioning block to disengage from the second floating member, and a positioning bar is provided between the positioning

|  | Embodiment 2 | Embodiment 3 | Embodiment 4 | Embodiment 5 | Embodiment 6 | Embodiment 7 | Embodiment 8 | Embodiment 9 |
|---|---|---|---|---|---|---|---|---|
| bending strength/MPa | 148 | 126 | 128 | 132 | 133 | 135 | 136 | 140 |
| tensile strength N/mm2 | 13.5 | 11.6 | 11.8 | 11.9 | 12.1 | 12.2 | 12.3 | 12.5 |
| Elongation at break/% | 650% | 580% | 590% | 600% | 560% | 610% | 620% | 570% |
| rebound rate/% | 81 | 75 | 74 | 70 | 73 | 77 | 78 | 76 | groove and the disengagement groove for restricting the positioning block within the positioning groove.

3. The detachable floating shaver as claimed in claim 1, wherein the head includes a first gear rotatably connected to the casing and a second gear meshing with the first gear, the second gear is connected with a cutting head, the first gear is provided with a protruding plate, the protruding plate is slidably connected with a connector; the accommodation trough is provided with a transmission rod protruding from the accommodation trough, the transmission rod is provided with an engaging groove, and the connector is provided with an engaging portion inserted into the engaging groove.

4. The detachable floating shaver as claimed in claim 3, wherein the protruding plate includes a plurality of protruding plates, and the protruding plates are arranged in an annular array around a rotating axle of the first gear.

5. The detachable floating shaver as claimed in claim 3, wherein a first elastic member is mounted between the connector and the first gear.

6. The detachable floating shaver as claimed in claim 3, wherein the main housing is provided with a protective cover and a motor, the transmission rod is rotatably connected to the protective cover, the transmission rod is equipped with a third gear located in the protective cover, and an output shaft of the motor is provided with a fourth gear that is disposed in the protective cover and meshes with the third gear.

7. The detachable floating shaver as claimed in claim 6, wherein a bottom surface of the accommodation trough is provided with a fixing plate abutting against the protective cover, and the first child pivot portions are disposed on the fixing plate.

8. The detachable floating shaver as claimed in claim 3, wherein the second gear is equipped with an insert plate, a lower end of the cutting head is connected with a rotary disc, the rotary disc is slidably connected to the insert plate, and an elastic member is mounted between the insert plate and the rotary disc.

9. The detachable floating shaver as claimed in claim 1, wherein a resilient pad is disposed between the second floating member and the first floating member, and a return spring is disposed under the first floating member.

10. The detachable floating shaver as claimed in claim 1, wherein the head further includes a shaving disc, and the shaving disc includes a floating cutting net.

* * * * *